United States Patent [19]

Gaudyn

[11] Patent Number: 4,571,041
[45] Date of Patent: Feb. 18, 1986

[54] THREE DIMENSIONAL PROJECTION ARRANGEMENT

[76] Inventor: Tad J. Gaudyn, 112 Meserole Ave., Brooklyn, N.Y. 11222

[21] Appl. No.: 664,861

[22] Filed: Oct. 25, 1984

Related U.S. Application Data

[60] Division of Ser. No. 341,613, Jan. 22, 1982, Pat. No. 4,492,442, which is a continuation-in-part of Ser. No. 82,211, Oct. 4, 1979, abandoned, which is a continuation-in-part of Ser. No. 917,400, Jun. 20, 1978, abandoned.

[51] Int. Cl.⁴ .............................................. G03B 21/00
[52] U.S. Cl. .......................................... 353/10; 353/7; 353/65
[58] Field of Search .................. 353/10, 7–9, 353/65–68, 81, 38, 98, 121, 122; 350/144

[56] References Cited

U.S. PATENT DOCUMENTS

1,698,221 1/1929 Craig ........................................ 353/7
3,096,389 7/1963 Dudley .................................... 353/10
3,293,983 12/1966 Gaudyn ................................. 353/10

Primary Examiner—Harry N. Haroian
Attorney, Agent, or Firm—Martin Smolowitz

[57] ABSTRACT

A projection arrangement for projecting three-dimensional images of objects into space. The object is illuminated by a source of light, and the light rays reflected from the object are directed so as to be incident on a mirror surface located behind a lens. The mirror surface receives an image from the lens and the combination forms an enlarged three-dimensional image projected into space. The lens can be in the form of a modified Fresnel lens of multiple focal lengths and having spherical zones in the form of strips. The Fresnel lens, which may be used in combination with other optical elements, provides a substantially large field of view suitable for viewing a three-dimensional image of the object by a mass audience. The image projection may be achieved without the use of a screen. The enlarged three-dimensional image appears floating in space visible to unaided eyes of an audience.

7 Claims, 12 Drawing Figures

THREE DIMENSIONAL PROJECTION ARRANGEMENT

CROSS REFERENCE TO RELATED APPLICATIONS

This is a divisional of application Ser. No. 341,613 filed Jan. 22, 1982, which is now U.S. Pat. No. 4,492,442 a continuation-in-part of application Ser. No. 082,211, filed Oct. 4, 1979, now abandoned which is a continuation-in-part of application Ser. No. 917,400, filed June 20, 1978, now abandoned.

BACKGROUND OF THE INVENTION

This invention pertains to an image projection arrangement for projection enlarged three-dimensional images of objects into space for viewing by observers.

Image projection from transparencies onto flat or curved surfaces or onto screens is well known. For example, U.S. Pat. No. 3,293,982 to Appeldorn and U.S. Pat. No. 3,340,765 to Herriott disclose systems for overhead projection of images from a transparency onto a displaced screen, whereby light is transmitted through the transparency, then reflected back and projected onto the screen. However, these devices project only flat two-dimensional images. U.S. Pat. No. 1,866,870 to O'Neill discloses an apparatus which projects a three-dimensional form, but it provides only minor magnification or enlargement of the image and has a limited viewing zone. Also, U.S. Pat. No. 3,293,983 to Gaudyn discloses a display device utilizing a parabolic mirror and conventional Fresnel lens to project a three-dimensional image of an object into space for side viewing.

A spherical lens, when the diameter is large and surpasses the radius of curvature, becomes bulky. Since refraction is accomplished at the surfaces, the major spherical part can be removed and a conventional Fresnel lens is thereby constructed. A conventional Fresnel lens is a flat thin piece of glass or plastic in which are molded a series of small concentric stepped zones extending from center to outer margin. Each groove provides a minute refracting facet capable of bending light.

SUMMARY OF INVENTION

It is an object of the present invention to provide a projection arrangement for objects in which a three-dimensional image of the object is formed in space and may be viewed by unaided eyes of numerous observers.

Another object of the present invention is to provide a projection arrangement of the foregoing character which uses a modified Fresnel lens and is substantially simple in construction and may be economically fabricated and operated.

In the present invention, a three-dimensional projection arrangement is provided which uses a multifocal refracting lens in combination with a reflecting mirror surface movable relative to the lens, such as a modified Fresnel lens together with a curved reflecting mirror located behind the lens to provide a three-dimensional image of an object projected into space for viewing by an audience. This reflecting mirror is preferably movable relative to the lens to provide adjustable magnification of the image.

By a modified Fresnel lens is meant a flat lens of transparent glass of plastic material and containing a plurality of facets having multiple focal lengths for which the multiple focal points are modified by a lens correction element. The modified Fresnel lens may have spherical zones in the form of strips rather than concentric rings as in the conventional type lens. A preferred lens configuration has its curved surface in the shape of a cycloid.

In space projection, the sphero-parabolic, fully modified Fresnel lens is a basic form. There are other regular combinations: sphero-elliptic, sphero-hyperbolic, double parabolic, etc. but the principal parts are that the system has to be concave and the first surface must be transformed into a Fresnel-type lens.

A reflecting system has many advantages over the refracting system in that chromatic, spherical aberrations, coma, astigmatism, and Petzval sum are either not existent or are greatly reduced. However, the reflecting system has an inherent drawback, namely, the obstruction of the incident light by the solid object or by some essential subsequent optical component.

The beam of light that forms the image is composed of hollow cones of light rays which result in a very poor quality of the image. In order to remove this malfunction, use can be made in the present invention of a variation of the split lens arrangement. The halves of the lens are preferably separated along the lateral and/or longitudinal optical axis, so that the light reflected from the object will use the lower part of the lens below its optical axis, and the rays reflected by the second surface of the modified Fresnel lens will use the upper part of the lens. Two smaller sizes of a modified Fresnel lens may also be used. In each case the solid object will not obscure its three-dimensional image.

As a result, a three-dimensional image is created and depth perception is observed with the unaided eye. While the conventional paraboloid reflecting mirror produces a highly directional image with a limited field of view accessible to few observers, the modified Fresnel lens in combination with a silvered second surface provides a vastly larger field of view, is suitable for viewing by a mass audience and for the direct projection of very large objects. When the fully modified Fresnel lens replaces a regular aplanatic concave meniscus, equal magnification is achieved for all three dimensions of a solid object as well as a larger field of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
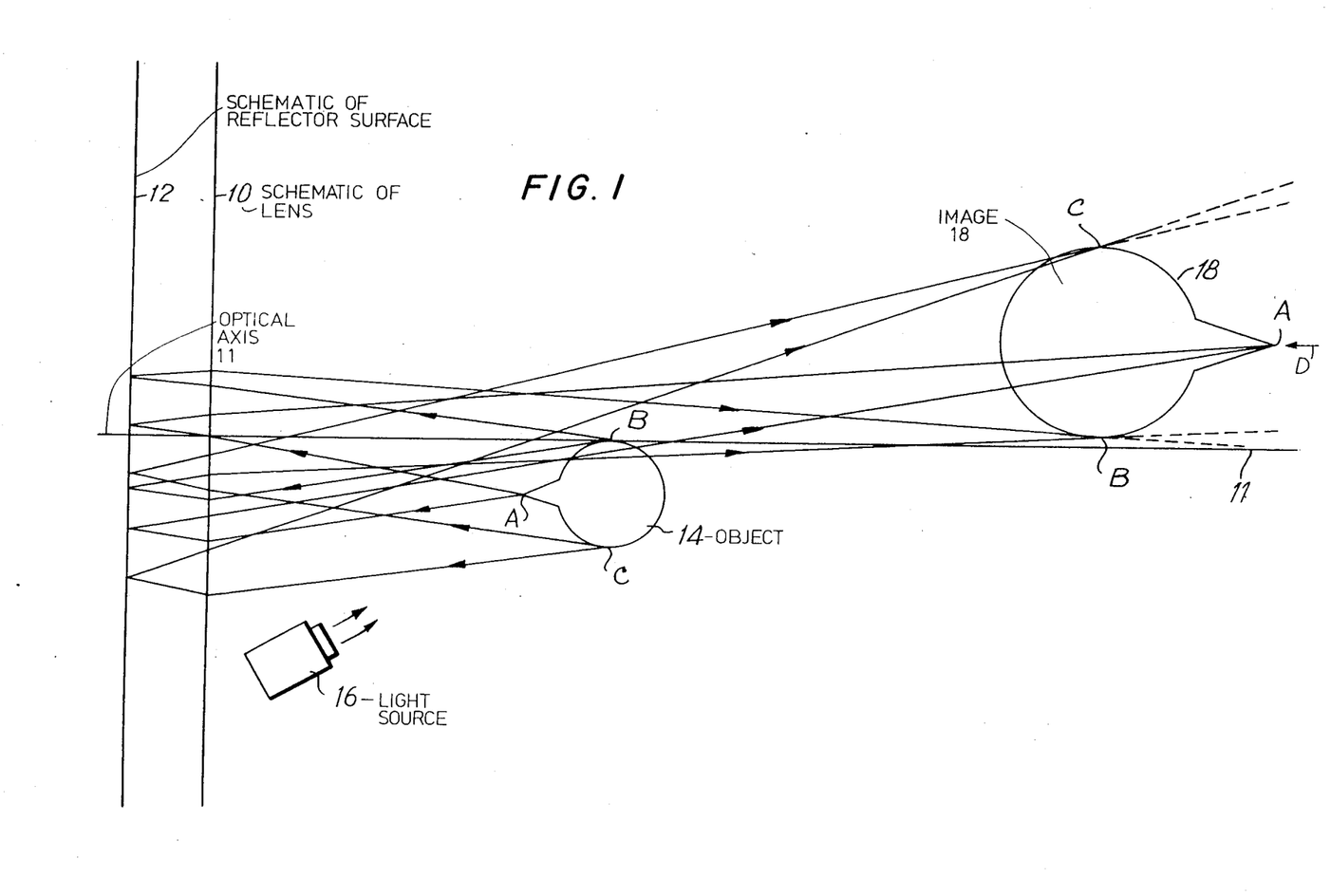
FIG. 1 shows a schematic optical ray diagram of the three-dimensional image projection system using the invention.

Referring to FIG. 1, there is provided a lens arrangement having a plano-spherical modified Fresnel lens at 10 having a silvered second surface 12. The light reflected from object 14 to lens 10 uses the lower part of the lens, i.e., below the optical axis 11. The rays reflected by the second surface 12 pass through the modified Fresnel lens using the upper part of the lens (above the optical axis). A light source 16 illuminates object 14 and beams of light emanating from it form an inverted image 18. Required longitudinal (depth) magnification is obtained by a fully modified Fresnel lens at 10. Viewing of the three-dimensional image 18 by an audience preferably occurs from a direction generally towards lens 10, as is shown by arrow "D". A split-lens arrangement may also be used in the form of two smaller modified Fresnel lens.

Figure 2:
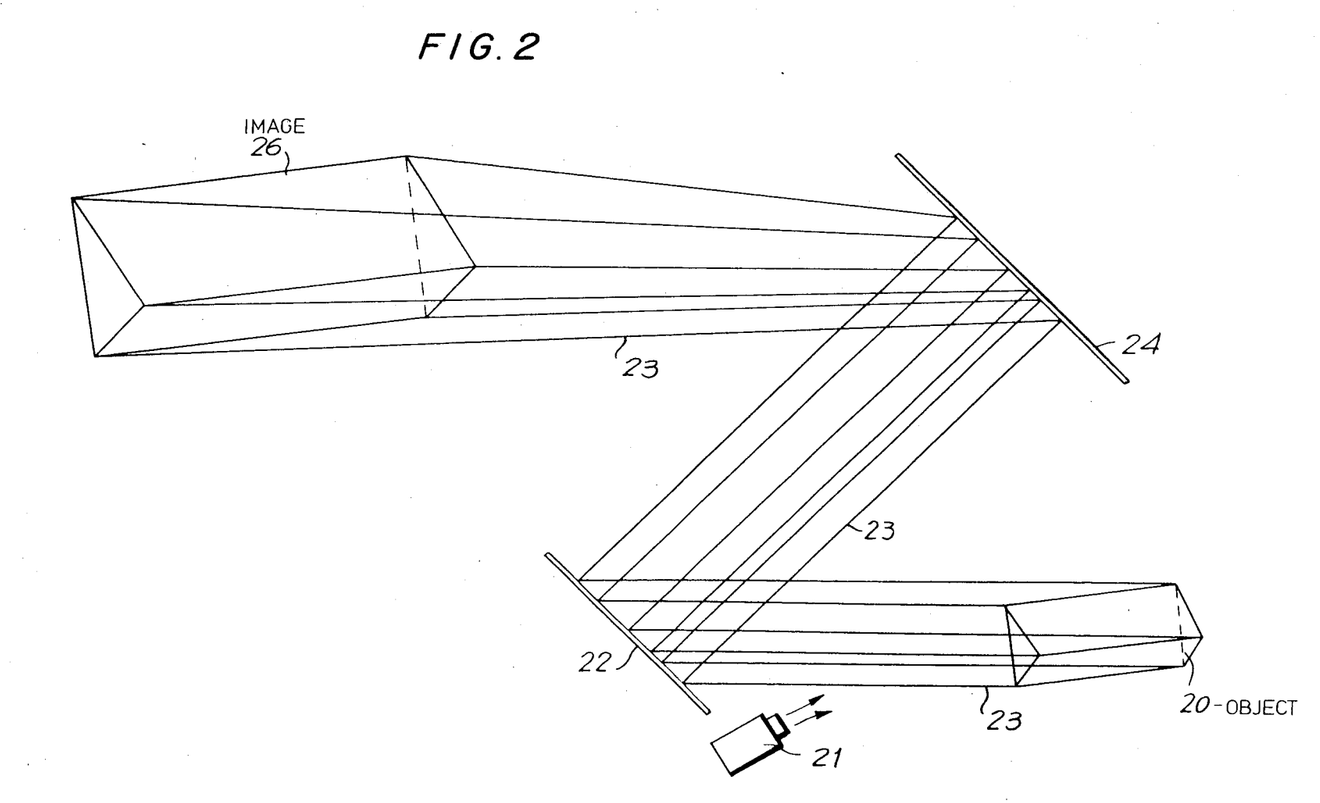
FIG. 2 shows an optical ray diagram of basic direct three-dimensional projection.

FIG. 2 shows basic direct projection and how the modified Fresnel lens 22 straightens the light rays by action of the silvered second surface 24. Dispersion of light rays can be minimized by giving this lens the shape of a thin wedge 22a, per FIG. 2A.

Figures 2A, 11:
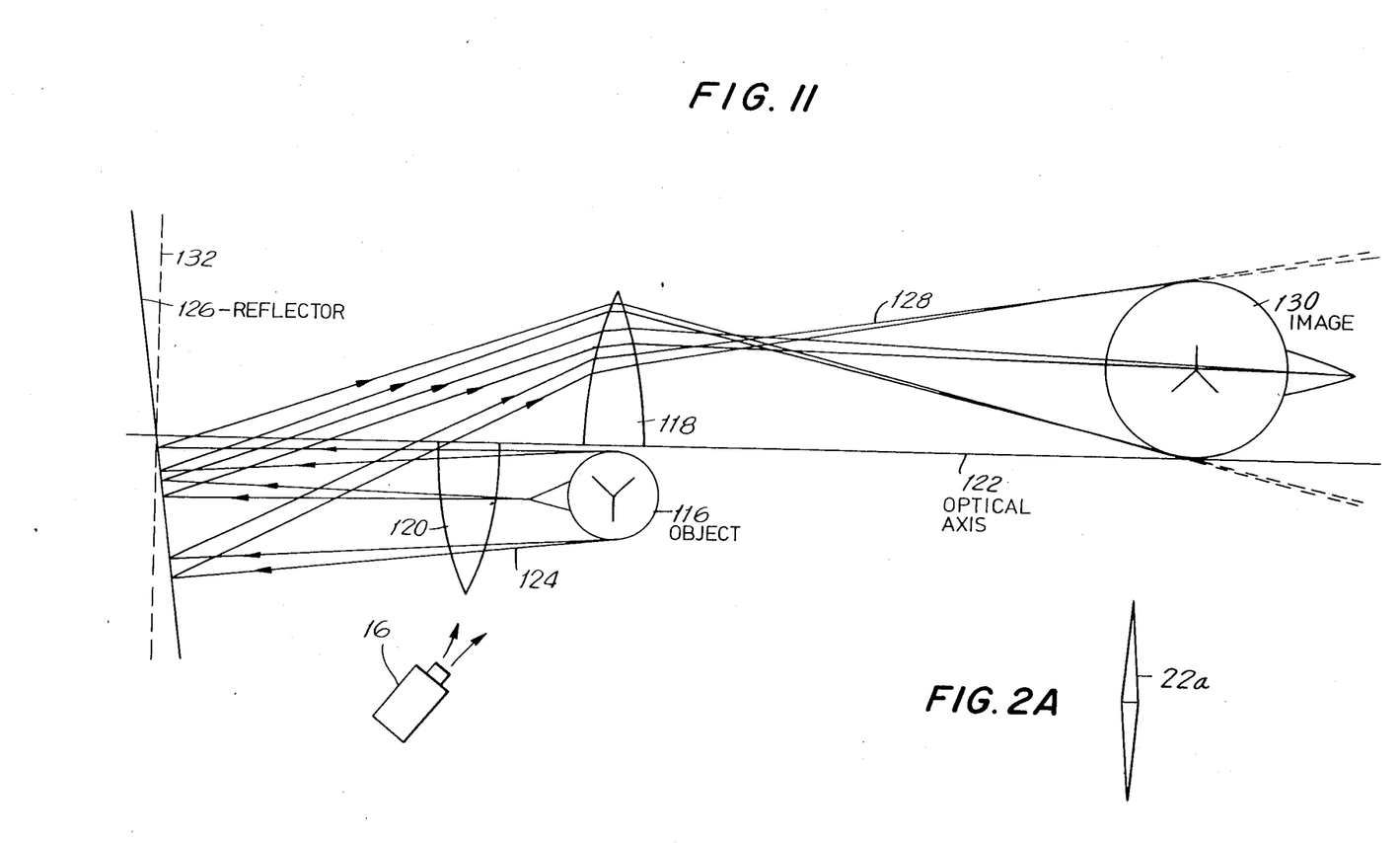
FIG. 2A shows a schematic of a lens with the shape of a thin wedge.
FIG. 11 shows an optical schematic of a longitudinally split lens arrangement, with some dimensions increased for clarity.

FIG. 2A shows a lens 22a in the form of a thin wedge-shape; such a thin wedge-shape serves to reduce dispersion of light, and can be formed by two wedge-shaped prisms joined at their bases or as a single unit. This lens can be advantageously positioned between other lenses to reduce the dispersion of light.

Thus, in FIG. 2 the object 20 is illuminated from a light source 21, for example. Reflected rays such as a ray 23, for example, is incident on a modified Fresnel lens 22. After reflection from the modified Fresnel lens 22, the ray 23 becomes incident on a further modified Fresnel lens 24. After reflection from the element 24, the ray 23 is projected into space, together with similar such rays, to form an enlarged three-dimensional image 26 of the object in space.

Figures 3, 4, 5A:
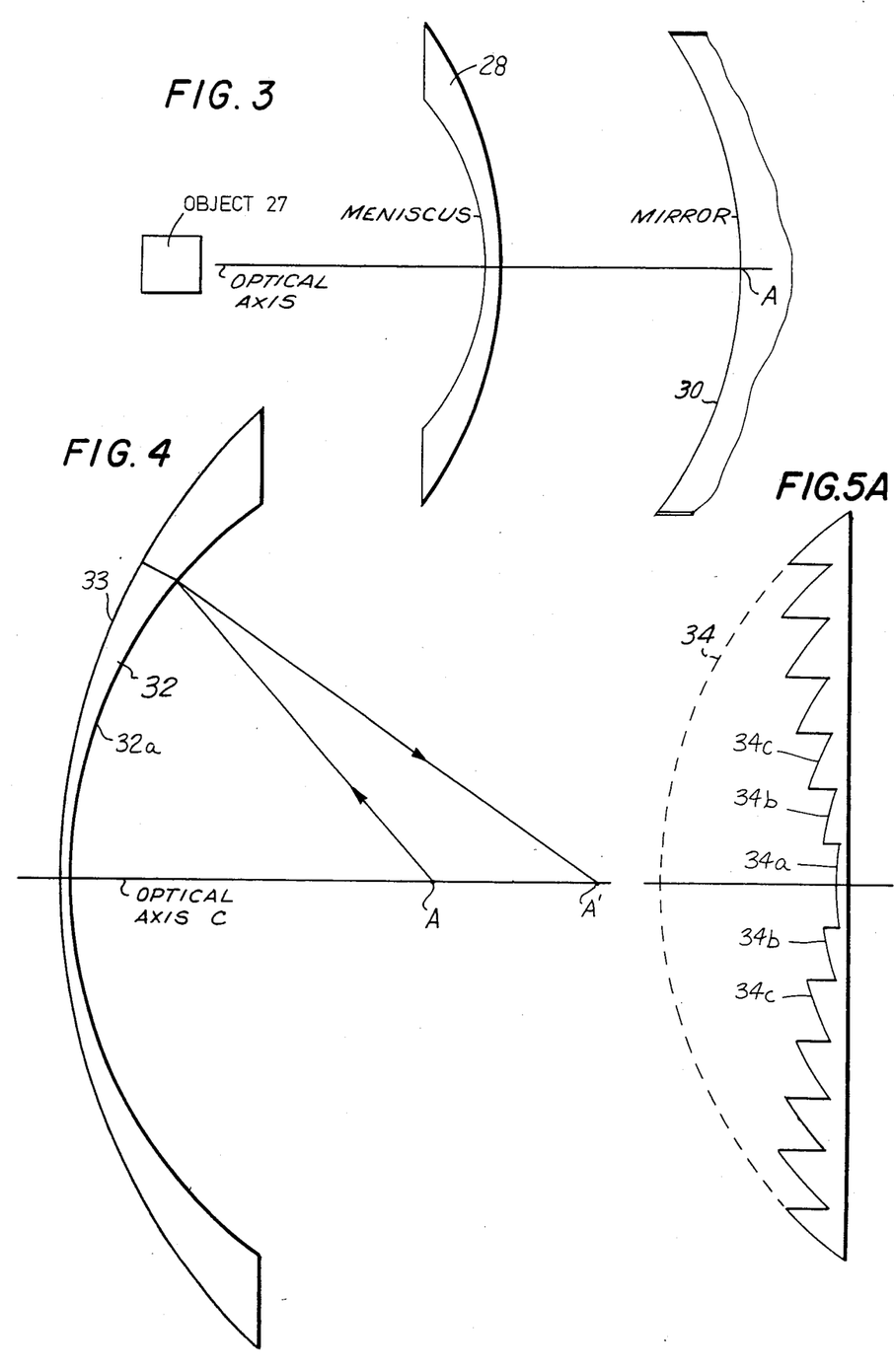
FIG. 3 shows a diagram of three aspherical surfaces which are elements of the modified Fresnel lens system, the first two forming an aspherical meniscus and the last being an aspherical mirror.
FIG. 4 shows an aplanatic concave meniscus, silvered at the back, which forms the paraboloid mirror.
FIG. 5A shows the spherical front surface of the meniscus of FIG. 4, transformed into a modified Fresnel type lens.

For projecting large and very large objects, the three-dimensional optical systems should consist of a concave aspherical meniscus 28 and a concave aspherical front mirror surface 30 located some distance behind the meniscus, as shown by FIG. 3. The object 27 to be projected is located in front of the meniscus 28. For optimum performance, characteristic shape of the optical surfaces, thickness of glass or plastic material, distance, size and focal length and number of Fresnel grooves have to be found by trial and error. Actual forms and dimensions depend on the depth of the three-dimensional object.

The paraboloid mirror 32 in FIG. 4 is an aplanatic concave meniscus which is silvered on the back. Considering two points A and A' on its optical axis, each is the center of curvature of the first and second surfaces, respectively. The characteristic feature of this meniscus is the ability to convert a wide-angle bundle of incident rays diverging from point A into a monocentric bundle. The rays, after having twice travelled across the thickness of the glass (or plastic), pass through point A', forming a diverging monocentric bundle, and are propagated through a medium or space. The front surface 32a of this meniscus is spherical, the second or back surface 33 is paraboloid. The spherical surface 32a may be transformed into a modified Fresnel type lens 34 as shown in FIG. 5A by providing the segments of spherical surface 34 at 34a, 34b, etc., and removing the unneeded curved portion of the lens as shown in dotted lines.

Figure 6:
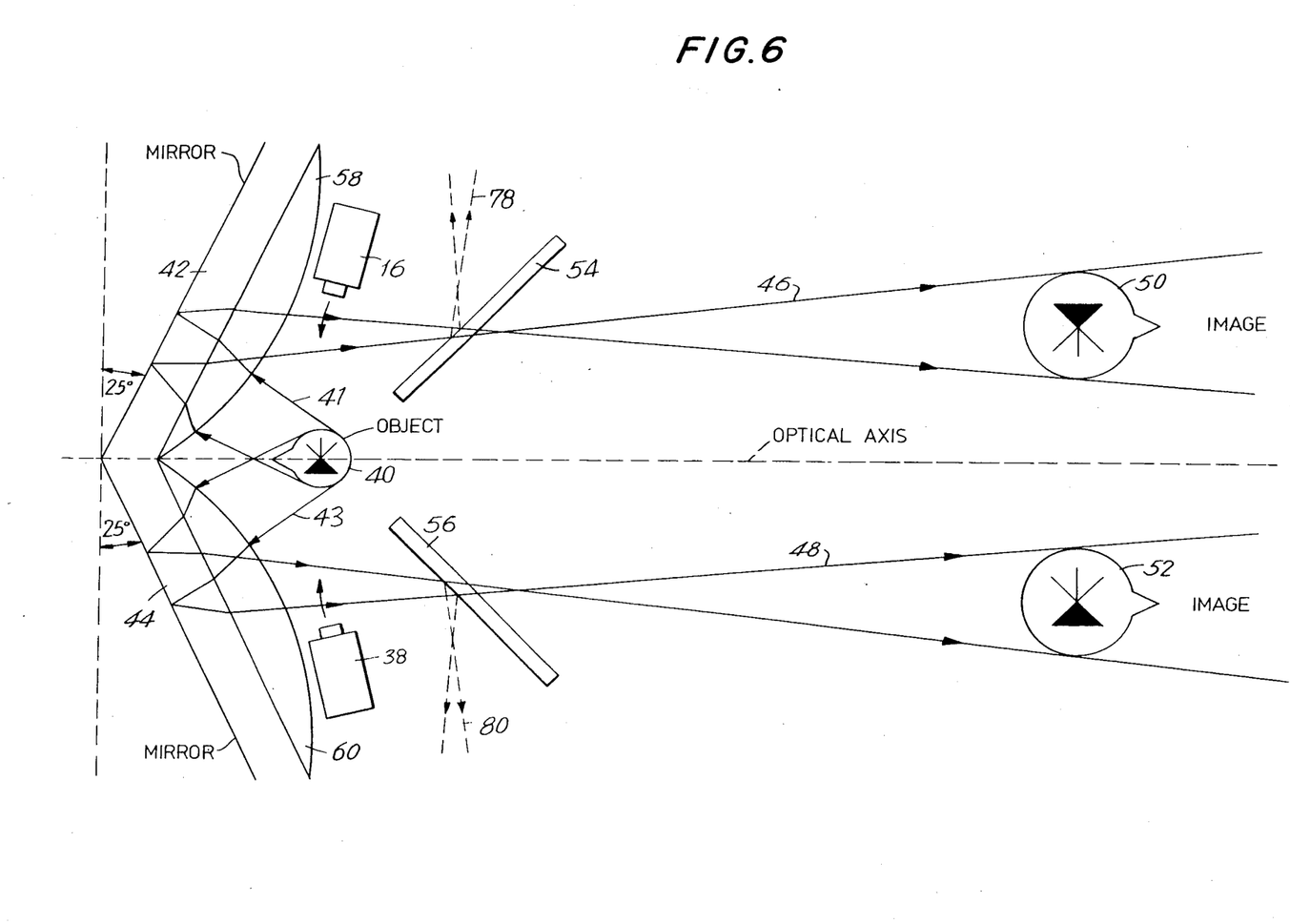
FIG. 6 shows a schematic arrangement for projecting into space, two three-dimensional images from a single object.

FIG. 6 shows another embodiment of the present invention, in which a single object 40 is illuminated by light sources 16 and 38, and has light rays directed from its surface through dual lenses 58 and 60 onto dual mirrors 42 and 44, which are conventional silvered-back surface mirrors. After light rays 41 and 43 from the object surface are reflected by these mirrors 42 and 44, they again pass through lenses 58 and 60 and produce separately projected rays 46 and 48 into space, whereby separate images 50 and 52 are obtained as magnified and inverted images. In addition thereto, mirrors 54 and 56 may be placed in the paths of rays 46 and 48, respectively, for use in conjunction with the arrangements of FIGS. 8 and 9 to be described. Adjacent to the mirrors 42 and 44, modified Fresnel lenses 58 and 60 are provided. For example, these modified Fresnel lenses may have a focal length of 8 inches and be approximately 11 inches square in dimensions. The object size may have maximum dimensions of 4 inches, for example, and the distance between the mirrors 42 and 44 and lenses 58 and 60, respectively, may be approximately 2 inches. The planes of mirrors 42 and 44 may be inclined from the vertical by about 25 degrees. Modified Fresnel lenses 58 and 60 are preferably of the cycloid type. By moving mirrors 42 and 44 and varying the spacing between the mirrors and each related lens 58 and 60, this controls the magnification of the final image.

Figures 7, 8:
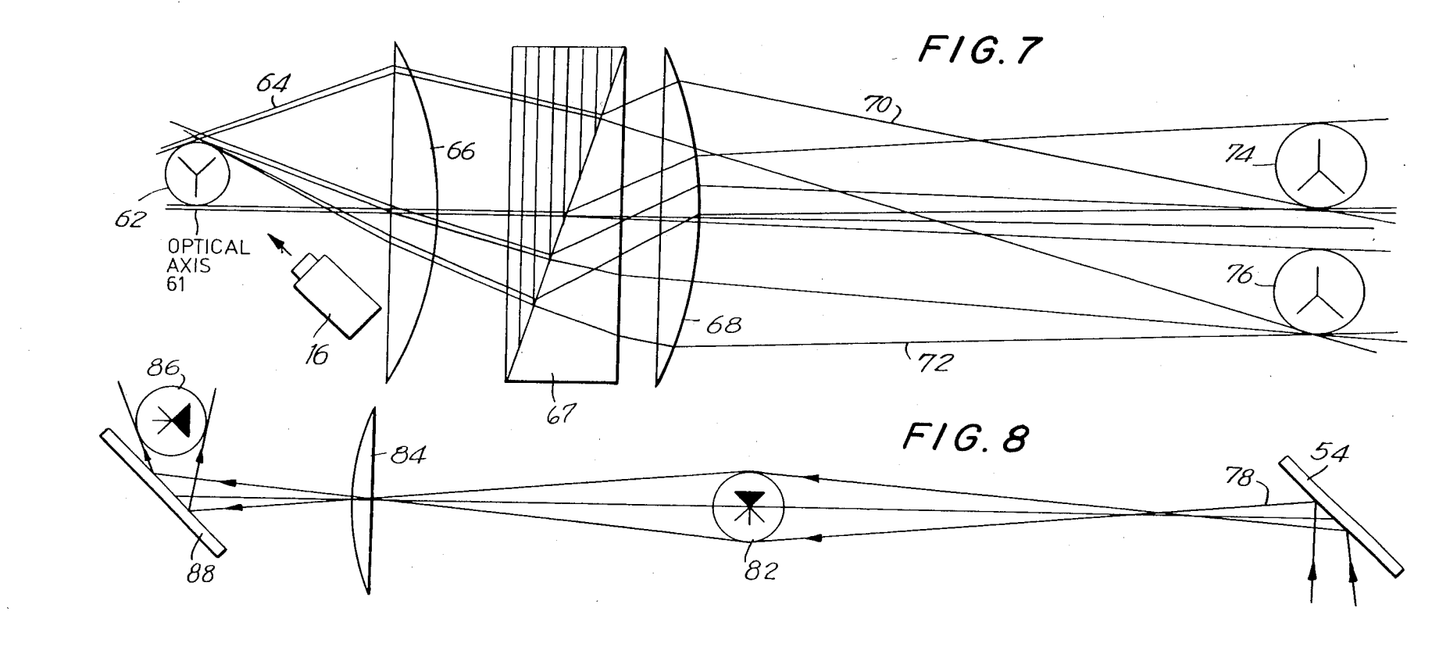
FIG. 7 is a schematic view which shows the projection of two images into space from a single object using a Wollaston prism.
FIG. 8 is a schematic optical diagram which shows an arrangement for separating laterally the images produced by the optical system of FIG. 6.

FIG. 7 discloses another arrangement which is adapted for projecting relatively small size objects, and for the purpose of producing double images with the aid of a Wollaston prism. After object 62 is illuminated by a light source 16, light rays 64 from the surface of the object are transmitted by a modified Fresnel lens 66, which may be of the plano-convex, cycloid type. This lens may preferably have a diameter of about 3 inches and a focal length of about 4 inches. Spaced from the modified Fresnel lens 66 is a further modified Fresnel lens 68 which is also of the plano-convex, cycloid type, having a diameter of about 3 inches and a focal length of about 7 inches. The Wollaston prism 67 is located between lenses 66 and 68 and is made of quartz and calcspar and is of the double refraction type with rectangular dimensions of 1 by 3 inches. After being transmitted by the lens 68, rays 70 and 72, obtained as a result of the separating function produced by the Wollaston prism, are projected into space to form double inverted and magnified images 74 and 76, respectively.

FIG. 8 shows an optical arrangement whereby the images produced with the arrangement of FIG. 6 are separated laterally. For this purpose, light rays 78 reflected by mirror 54 deflect the inverted image 82. Mirrors 54 and 56 are preferably conventional silvered-back surfaces having dimensions of 6 inches by 6 inches. A modified Fresnel lens 84 following the image 82 is preferably of the plano-convex, cycloid type having a diameter of 5.5 inches and a focal length of 24 inches. Lens 84 comprises an erector lens whereby an erect image 86 is obtained after the rays transmitted by lens 84 are reflected further by a mirror 88, for example. A suitable position of lens 84 makes it possible to obtain, at will, positive or negative or unit magnifications. The separation of the double images amounts to a few yards. For more extended distances of separation of the images, a periscopic system is needed. Such a system uses a series of three lenses, with unit magnification, to conduct the light down a tube which is 8 inches in diameter and 40 feet long.

It is to be noted that a flat Fresnel lens and cycloid lens offer considerably larger fields of view, when compared to spherical lenses and mirrors. At the same time, two images of the same object serve to double the field of view. In addition, the present invention provides that the image can be produced almost of the same size as in a conventional two-dimensional movie screen. The effect is that the eyes of an observer are presented with a wide field of view as in normal vision. As a result, a mass audience may see the three-dimensional images at the same time.

Figure 9:
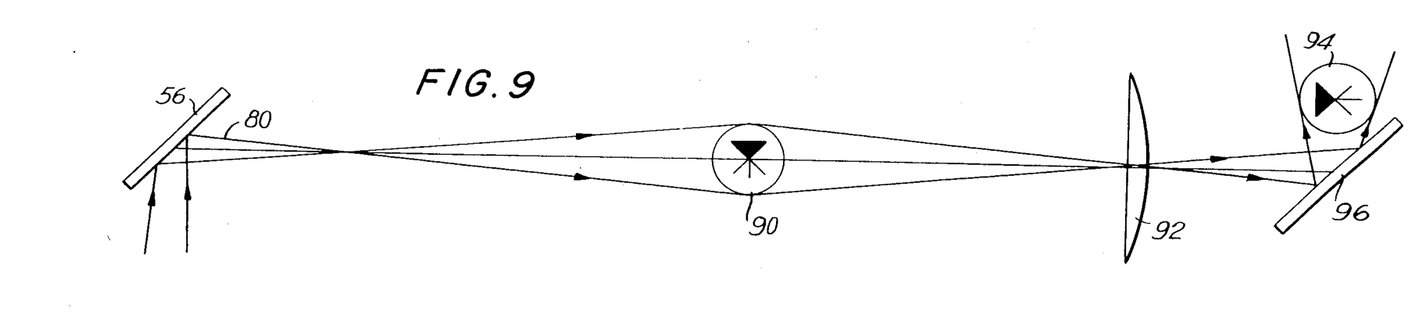
FIG. 9 is a schematic optical diagram used in conjunction with the diagram of FIG. 8, to separate laterally the images produced by the optical system of FIG. 6.

FIG. 9 is similar to FIG. 8, in that rays 80, after reflection by mirror 56 form the inverted image 90, which, after being transmitted by a lens 92 similar to lens 84, is converted to an erect image 94, after reflection by mirror 96. Mirror 96 corresponds to mirror 88.

Figure 10:
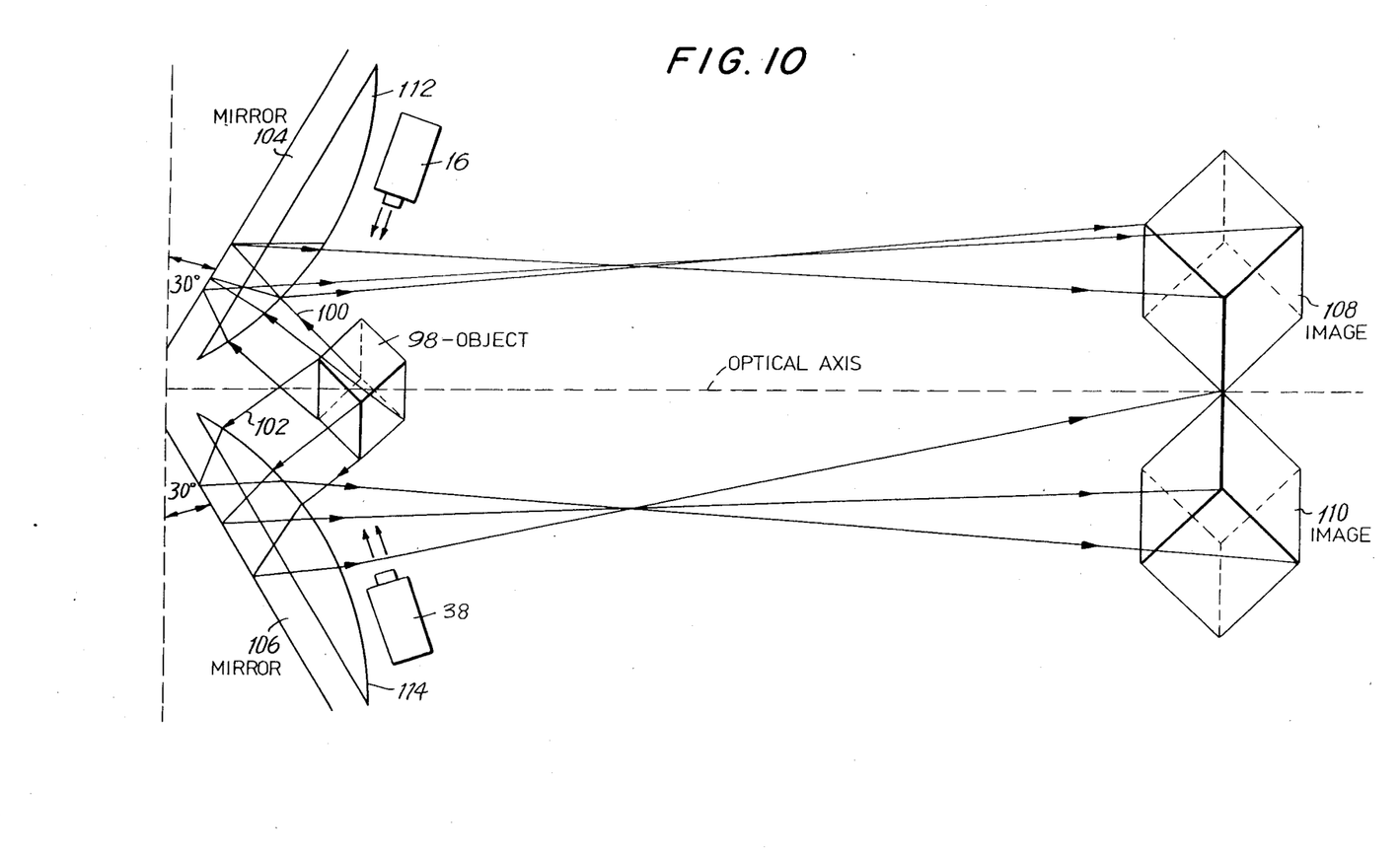
FIG. 10 is a schematic and geometric diagram for projecting three-dimensional double images of a typical object such as a cube into space.

FIG. 10 illustrates a projection arrangement in which the front-three faces of a cube and the back-three faces of the same cube may be projected into space. The object 98 is illuminated by light sources 16 and 38 and after light rays 100 and 102 are reflected by mirrors 104 and 106, the two images of the cube 108 and 110, respectively, are formed. Image 108 presents the back square faces of the cube, whereas image 110 presents the front square faces of the cube. When using a cube measuring 4 by 4 inches, for example, mirrors 104 and 106 are preferably conventional, silvered-back surfaces, with dimensions 12 by 12 inches square. Lenses 112 and 114, which are spaced from the elements 104 and 106, respectively, are preferably of the cycloid type, having a focal length of 8 inches and measuring 11 inches by 11 inches square.

When viewing a three-dimensional object such as a cube shown in FIG. 10, only three square faces out of six may be viewed simultaneously, whether such viewing is carried out with unaided eyes or with suitable optical instruments. The arrangement of FIG. 10 may also be used for visual inspections and defects of products produced by machines, for example.

FIG. 11 illustrates a projection arrangement using a longitudinally split lens. The lens is split into halves 118 and 120, and these are spaced from each other along the optical axis 122. After the surface of the object 116 is illuminated by a light source 16, the light rays 124 are transmitted by the lens half 120 onto a reflector 126. This reflector then directs the light rays to lens half 118, from which the transmitted light rays 128 form a magnified and inverted image 130. The reflector 126 can be inclined from the vertical plane 132, and inclined at the most suitable angle with respect to the optical axis. Also, the lens halves 118 and 120 can be separated transversely, axially and vertically as desired.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

I claim:

1. A three-dimensional projection arrangement for projecting dual three-dimensional images into space for viewing by an audience, comprising:
    (a) an object for which dual three-dimensional images are projected;
    (b) dual light sources for illuminating said object;
    (c) dual adjacent lens means each comprising a multiple refracting type lens having multiple focal lengths, said dual lens being positioned to receive reflected light from said object; and
    (d) dual reflecting mirror means movably located behind said dual lens means, said mirror means being adjustable relative to the lens and adapted for receiving an image of said object from said lens means and reflecting said image back through said lens means, whereby said dual lens means and said dual mirror means receive light rays from the illuminated object and form dual three-dimensional images projected into space for viewing by the audience.

2. A three-dimensional image projection arrangement as defined in claim 1, wherein light rays from said dual lens means and said dual mirror means are further reflected by second dual mirror means to provide dual laterally separated three-dimensional images.

3. A three-dimensional projection arrangement as defined in claim 2, wherein the laterally separated images are further projected by second dual modified Fresnel lenses.

4. A three-dimensional image projection arrangement as defined in claim 1, wherein said dual light sources illuminate opposite sides of said object.

5. A three-dimensional image projection arrangement as defined in claim 1, wherein said lens means are modified Fresnel type lens.

6. A three-dimensional projection arrangement for projecting dual three-dimensional images into space for viewing by an audience, said arrangement comprising:
    (a) an object for which dual three-dimensional images are projected;
    (b) dual light sources for illuminating said object;
    (c) first dual adjacent lens means each comprising a modified Fresnel type lens having multiple focal lengths;
    (d) dual reflecting mirror means movably located behind said first dual lens means, whereby said lens means are movable relative to said first mirror means and said mirror means receives light rays from the illuminated object and forms dual three-dimensional images projected into space; and (e) a second dual lens and dual mirror means located so as to receive light from said first lens and reflect the light laterally to form a second image in space.

7. A three-dimensional projection arrangement for projecting dual three-dimensional images into space for viewing by an audience, said arrangement comprising:

(a) an object for which dual three-dimensional images are projected;

(b) a light source for illuminating said object;

(c) a first refracting lens means located for receiving light from the illuminated object;

(d) a second refracting lens means spaced from the first lens along a common optical axis; and (e) a Wollaston prism located between said first and second lens means, whereby light rays from the illuminated object pass through said first lens means and are separaged by the prism, then the separate rays pass through said second lens means and form the dual images in space.

* * * * *